United States Patent [19]
Caldwell et al.

[11] Patent Number: 4,872,282
[45] Date of Patent: Oct. 10, 1989

[54] ANT TRAP

[76] Inventors: Glen D. Caldwell, Rt. 1, Box 37; Kenneth D. Craven, Rt. 1, Box 43, both of Byers, Okla. 74831

[21] Appl. No.: 331,911

[22] Filed: Apr. 3, 1989

[51] Int. Cl.$^4$ .............................................. A01M 1/10
[52] U.S. Cl. ........................................ 43/121; 43/60
[58] Field of Search .................... 43/121, 124, 132, 60

[56] References Cited

U.S. PATENT DOCUMENTS

| | | |
|---|---|---|
| 29,468 | 8/1860 | Cottingham et al. |
| 111,291 | 1/1871 | Williams |
| 140,954 | 7/1873 | Rubarth |
| 249,931 | 11/1881 | Harned |
| 400,460 | 4/1889 | Jennings |
| 407,889 | 7/1889 | Davis .................................... 43/121 |
| 1,018,277 | 2/1912 | Suhre |
| 1,482,992 | 2/1924 | Hoffbauer |
| 1,500,518 | 7/1924 | Mullen |
| 1,519,456 | 12/1924 | Jones |
| 1,791,145 | 2/1931 | Rawlings |
| 2,234,500 | 3/1941 | Moore .................................... 43/121 |
| 2,565,142 | 8/1951 | Mattingly ............................... 43/121 |
| 2,997,806 | 8/1961 | Duvall ................................... 43/121 |
| 3,320,692 | 5/1967 | Hellen .................................... 43/65 |
| 3,550,308 | 12/1970 | Ibach .................................... 43/121 |
| 3,872,619 | 3/1975 | McIlwain ............................... 43/60 |
| 4,035,946 | 7/1977 | Rapp et al. ............................ 43/131 |
| 4,160,335 | 7/1979 | Von Kohorn et al. ................ 43/131 |

Primary Examiner—M. Jordan
Attorney, Agent, or Firm—Dunlap, Codding, Peterson & Lee

[57] ABSTRACT

A trap for capturing crawling insects is provided. The trap includes a cylindrical outer housing, a container slidably inserted within the outer housing and a conical entrant lid is detachably secured to the upper end of the container. The outer housing is positioned in the ground such that when the container is inserted therein, the conical entrant lid is substantially level with the ground. Insects traversing the conical entrant lid cascade into the container and are retained therein. The trap also includes a lifting ball pivotally secured to the container for removing the container from the outer housing.

5 Claims, 1 Drawing Sheet

ANT TRAP

BRIEF SUMMARY OF THE INVENTION

1. Field of the Invention.

The present invention relates generally to insect traps.

2. Background of the Invention.

The present invention provides an apparatus for trapping ants and other crawling insects. In the present invention a removable container, having a smooth sided conical entrant lid, is positioned within a rigid cylindrical outer housing. The outer housing is inserted into the ground such that the top of the lid is substantially flush with the ground surface.

Insects traversing the conical entrant lid are channeled into the container, which may be periodically removed from the outer housing and the contents of the container emptied. As the outer housing is constructed of a sufficiently rigid material, the earth adjacent thereto is retained in place such that the container may be reinserted into the outer housing.

DESCRIPTION OF THE PREFERRED EMBODIMENT

Figure 1:
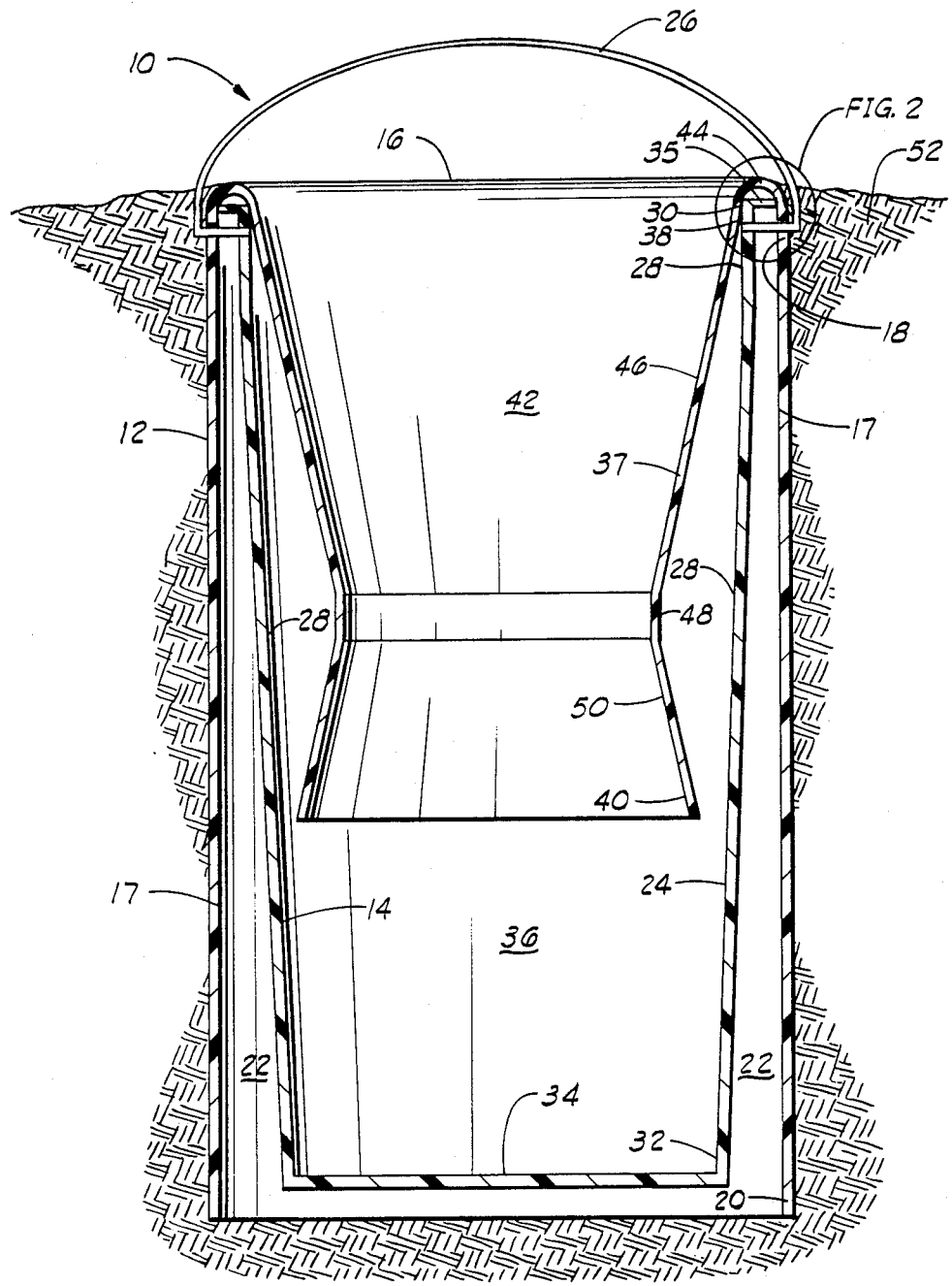
FIG. 1 is a vertical cross-sectional view of an ant trap constructed in accordance with the present invention.

As shown in FIG. 1, the present invention comprises an ant trap designated generally by the reference numeral 10. The ant trap 10 includes a cylindrical outer housing 12, a cylindrical container 14 and a frusto-conical entrant lid 16.

The outer housing 12 has a continuous side wall 17. The side wall 17 includes an open upper end 18 and an open lower end 20 and an opening 22 extending between the upper end 18 and the lower end 20. The outer housing 12 is constructed of a rigid, weather resistant material, such as plastic.

The container 14 includes a body 24 and a lifting bail 26, described in greater detail below, pivotally secured to the body 24. The body 24 includes a downwardly and inwardly converging continuous side wall 28 having an open upper end 30 (FIG. 2) and an open lower end 32. The body 24 also includes a floor 34 integral with the lower end 32 thereof and an annular, outwardly extending shoulder 35 (FIG. 2) integral with the upper end 30 thereof.

The container 14 further includes an internal cavity 36 defined by the side wall 28 and the floor 34. The surfaces of the body 24 defining the internal cavity 36 are preferably smooth.

Figure 2:
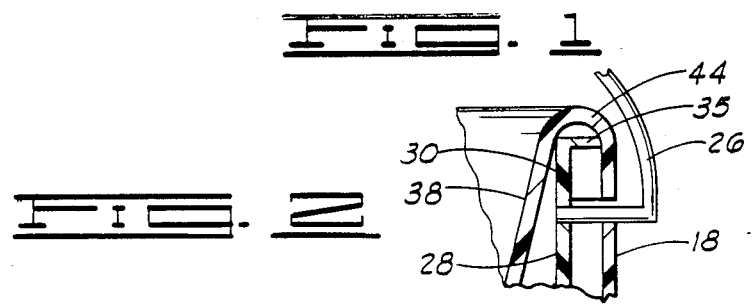
FIG. 2 is an enlarged fragmented view of a portion of the structure shown in FIG. 1.

The container 14 is also constructed of a rigid, weather resistant material, such a plastic. Additionally, the container 14 is sized for insertion into the opening 22 of the outer housing 12 such that the upper end 30 of the container is above the upper end 18 of the outer housing 12 as shown in FIG. 2.

The frusto-conical entrant lid 16 includes a smooth surface, continuous side wall 37, having an open upper end 38, an open lower end 40 and an opening 42 extending between the upper end 38 and the lower end 40. The entrant lid 16 is further characterized by a lip 44 integral with the upper end 38 thereof.

The lip 44 has an inverted J-shaped cross section and is sized for frictionally engaging the shoulder 35 of the container 14. In this way, by overcoming the frictional force between the lip 44 and the shoulder 35, the entrant lid 16 may be secured to, or removed from, the container 14.

The lifting bail 26 is preferably constructed of a light gauge, weather resistant metal wire. As shown in FIG. 2, each end of the lifting bail 26 extends through an aperture in the side wall 28 below the level of the channel member 44 thereby pivotally securing the bail 26 to the container 14. Additionally, a portion of the lifting bail 26 adjacent the container 14 and extending therefrom engages the upper end 18 of the outer housing 12. In this way, the container 14 may be suspended within the outer housing 12 and removed therefrom without disturbing the alignment of the conical entrant lid 16 with the container 14.

The side wall 37 of the entrant lid 16 is further characterized by a downwardly and inwardly converging upper portion 46, an intermediate portion 48 and a downwardly and outwardly diverging lower portion 50. The upper portion 46 extends from the upper end 38 of the lid 16 to the intermediate portion 48.

The intermediate portion 48 is characterized as having a constant diameter over the length thereof. As shown in FIG. 1, the diameter of the intermediate portion 48 is less than the diameter of the upper portion 48 at the upper end 38 of the entrant lid 16.

The outwardly diverging lower portion 50 extends from the intermediate portion 48 and terminates at the lower end 40 of the lid 16. As shown in FIG. 1, the diameter of the lower end 40 is greater than the diameter of the intermediate portion 48 but less than the diameter of the upper portion 46 at the upper end 38.

In operation, a hole is dug in the ground 52 preferably adjacent an ant mound or trail (not shown). The hole is sized such that the walls thereof snugly accommodate the container and the depth thereof is substantially equal to the length of the outer housing 12. The outer housing 12 is inserted into the hole such that the upper end 18 thereof is substantially even with the level of the ground 52. The container 14, having the entrant lid 16 secured thereto, is inserted into the opening 22 of the outer housing 12 such that a portion of the lifting bail 26 contacts the upper end 18 of the outer housing 12, as described above. The ground 52 adjacent the upper end 18 of the outer housing 12 is then feathered against the channel 44.

Insects traversing the conical entrant lid 16 cascade the length thereof and are retained within the container 14. Generally, escape from the trap 10 is prevented by the smooth side wall 28 of the container 14 and the smooth side wall 37 of the entrant lid 16.

Preferably, after approximately two days of use, the container 14 should be removed from the outer housing 12, the concial entrant lid 16 separated from the container 14 and the container 14 emptied. The container 14 and the conical entrant lid 16 should then be thoroughly cleaned with warm water and soap. The container 14 and the conical entrant lid 16 may then be reassembled and reinserted into the outer housing 12 and prepared as described above.

Changes may be made in the construction, operation, and arrangement of the various parts, elements, and procedures described herein without departing from the spirit and scope of the invention as defined in the following claims.

What is claimed is:

1. An insect trap comprising:
   an outer housing having an upper end and a lower end and an opening extending between the upper end and the lower end;
   a container having an open upper end, a continuous side wall and a closed lower end, wherein the container is sized for insertion into the opening of the outer housing; and
   a frusto-conical entrant lid having a smooth surface continuous side wall, wherein the smooth surface continuous side wall extends into the container, and wherein the smooth surface continuous side wall has an open upper end and an open lower end and an opening extending between the upper end and the lower end, and wherein a portion of the frusto-conical entrant lid adjacent the open upper end of the smooth surface continuous side wall is secured to and overlies the upper end of the container.

2. The apparatus of claim 1 wherein the smooth surface continuous side wall is further characterized as having an upper converging portion and a lower diverging portion.

3. The apparatus of claim 1 further comprising a lifting bail pivotally secured to the upper end of the container.

4. An insect trap comprising:
   a cylindrical outer housing having an upper end and a lower end and an opening extending between the upper end and the lower end;
   a container, sized for insertion into the opening of the cylindrical outer housing, having an open upper end, a continuous side wall and a closed lower end, wherein the open upper end has an outwardly extending shoulder integral therewith, and wherein the container is further characterized as having a cavity extending between the open upper end and the closed lower closed end; and
   a conical entrant lid having an upper end and a lower end and an opening extending between the upper end and the lower end, wherein the upper end has an outwardly extending lip integral therewith, the lip being sized for overlying and frictionally engaging the outwardly extending shoulder of the upper end of the container such that the conical entrant lid is detachably secured thereto.

5. The apparatus of claim 3 further comprising a lifting bail pivotally secured to the upper end of the container.

* * * * *